(12) United States Patent
Noh et al.

(10) Patent No.: US 9,998,456 B2
(45) Date of Patent: Jun. 12, 2018

(54) SYSTEM AND METHOD FOR ONE TIME PASSWORD-BASED AUTHENTICATION

(71) Applicant: SAMSUNG SDS CO., LTD., Seoul (KR)

(72) Inventors: Hyun-Woo Noh, Seoul (KR);
Sung-Duck Kim, Seoul (KR);
Hak-Hyun Nam, Seoul (KR);
Geun-Young Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 115 days.

(21) Appl. No.: 14/881,593

(22) Filed: Oct. 13, 2015

(65) Prior Publication Data
US 2016/0105426 A1 Apr. 14, 2016

(30) Foreign Application Priority Data
Oct. 13, 2014 (KR) ........................ 10-2014-0137872

(51) Int. Cl.
*G06F 7/04* (2006.01)
*H04L 29/06* (2006.01)

(52) U.S. Cl.
CPC ................... *H04L 63/0838* (2013.01); *H04L 2463/121* (2013.01)

(58) Field of Classification Search
CPC ........... H04L 63/0838; H04L 29/06789; G06F 21/31
USPC ............................................................ 726/6
See application file for complete search history.

(56) References Cited

U.S. PATENT DOCUMENTS

| 4,464,749 | A * | 8/1984 | Ulug ....................... G06F 13/37 370/451 |
| 8,452,980 | B1 * | 5/2013 | Black ..................... G06F 21/554 713/185 |
| 8,560,837 | B1 * | 10/2013 | Duane ..................... H04L 29/06 370/457 |
| 9,525,551 | B1 * | 12/2016 | Ackerman ............ H04L 9/3228 |

(Continued)

OTHER PUBLICATIONS

Alghathbar et al, Noisy Password Scheme: A New One Time Password System, 2009, IEEE, pp. 841-846.*

(Continued)

*Primary Examiner* — James Turchen
*Assistant Examiner* — Jenise Jackson
(74) *Attorney, Agent, or Firm* — Sughrue Mion, PLLC (57) ABSTRACT

Disclosed are a system and a method for one-time password (OTP)-based authentication. The system for OTP-based authentication includes a transceiver module configured to receive an authentication request from a client and transmit a result of the authentication according to the authentication request to the client, an authentication accumulation management module configured to provide statistical information about authentication success of the client for each time interval within a predetermined effective range of time, an OTP generation module configured to generate a server-side OTP using previously stored authentication information and time information that is acquired from the statistical information about authentication success, and an authentication module configured to authenticate the client by comparing a client-side OTP included in the authentication request with the server-side OTP.

11 Claims, 4 Drawing Sheets

| TIME(t) | NUMBER OF AUTHENTICATION SUCCESSES | PRIORITY ORDER |
|---|---|---|
| -90 | 1 | 18 |
| -80 | 2 | 17 |
| -70 | 3 | 16 |
| -60 | 4 | 15 |
| -50 | 5 | 14 |
| -40 | 6 | 13 |
| -30 | 70 | 7 |
| -20 | 80 | 5 |
| -10 | 90 | 3 |
| 0 | 100 | 1 |
| 10 | 85 | 4 |
| 20 | 95 | 2 |
| 30 | 75 | 6 |
| 40 | 65 | 8 |
| 50 | 15 | 9 |
| 60 | 12 | 10 |
| 70 | 11 | 11 |
| 80 | 10 | 12 |

AUTHENTICATION REQUEST TIME →

(56) References Cited

U.S. PATENT DOCUMENTS

| | | | |
|---|---|---|---|
| 2007/0133591 A1* | 6/2007 | Shatford | H04L 63/0442 370/457 |
| 2007/0250923 A1* | 10/2007 | M'Raihi | G06F 21/34 726/18 |
| 2011/0191592 A1* | 8/2011 | Goertzen | G06F 21/36 713/182 |
| 2013/0151359 A1* | 6/2013 | Fujisawa | G06Q 20/204 705/17 |
| 2014/0082710 A1* | 3/2014 | Lu | H04L 9/3228 726/6 |
| 2014/0115341 A1* | 4/2014 | Robertson | H04L 9/3228 713/183 |
| 2014/0143844 A1* | 5/2014 | Goertzen | G06F 21/36 726/5 |
| 2014/0365780 A1* | 12/2014 | Movassaghi | H04L 63/0838 713/184 |

OTHER PUBLICATIONS

Alzomai et al, The Mobile Phone as a Multi OTP Device Using Trusted Computing, 2010, IEEE, pp. 75-82.*

* cited by examiner

| TIME(t) | NUMBER OF AUTHENTICATION SUCCESSES | PRIORITY ORDER |
|---|---|---|
| -90 | 1 | 18 |
| -80 | 2 | 17 |
| -70 | 3 | 16 |
| -60 | 4 | 15 |
| -50 | 5 | 14 |
| -40 | 6 | 13 |
| -30 | 70 | 7 |
| -20 | 80 | 5 |
| -10 | 90 | 3 |
| 0 | 100 | 1 |
| 10 | 85 | 4 |
| 20 | 95 | 2 |
| 30 | 75 | 6 |
| 40 | 65 | 8 |
| 50 | 15 | 9 |
| 60 | 12 | 10 |
| 70 | 11 | 11 |
| 80 | 10 | 12 |

AUTHENTICATION REQUEST TIME →

FIG. 4

SYSTEM AND METHOD FOR ONE TIME PASSWORD-BASED AUTHENTICATION

CROSS-REFERENCE TO RELATED APPLICATION

This application claims priority to and the benefit of Korean Patent Application No. 10-2014-0137872, filed on Oct. 13, 2014, the disclosure of which is incorporated herein by reference in its entirety.

BACKGROUND

1. Field

Disclosed embodiments relate to a technology for security and authentication of a system over a network

2. Discussion of Related Art

A one-time password (OTP) is one of network security technologies, and a security system in which a new password should be used every time a user desires to get authentication. Such a method may prevent critical security drawbacks with leakage of a fixed password in the general ID/password based security system. In the recent years, the OTP is being used in more and more businesses and financial institutions that require a high level of security.

The types of OTP include S/Key OTPs, challenge-response OTPs, and time-synchronized passwords. The time-synchronized passwords are implemented using time in generating an OTP, as its name represents. When a user generates a client-side OTP using a Personal Identification Number (PIN), a user's password and a secret key, and transmits the generated client-side OTP to an authentication server, the authentication server generates a server-side OTP using user authentication information (init_secret and PIN) that matches a client ID and checks whether the generated server-side OTP coincides with the received client-side OTP.

The time-synchronized password requires the authentication server and the user to enter the identical time as an input value of an OTP. Accordingly, if there is a time mismatch between an authentication server token and a user token, a user authentication can only fail. However, it is actually not easy to synchronize time between each user terminal and a server at all times. That is, since an actual operating environment may have a delay in an OTP authentication request and a delay in transmission between a client and an authentication server, an effective range of time is set based on an error in delay time such that authentication is allowed to succeed within the effective range of time. For example, the authentication server sets an effective range of time between a predetermined time interval before an authentication request reception time and a predetermined time interval after the authentication request reception time (for example, −90 seconds to +90 seconds), and if one of a server-side OTPs generated from time information within the effective range of time coincides with a user OTP, it is determined that an authentication succeeds.

However, in this case, depending on the effective range of time, the authentication server may need to generate a plurality of OTP candidates that are then compared, which increases a burden on the server in the authentication process. That is, in the conventional technology, the authentication server sequentially generates OTPs every 10-seconds from −90 seconds before a point of time at which the authentication request is received by the authentication server to +90 seconds after the point of time, and compares the generated OTPs with a client OTP. For example, when the authentication request is received by the authentication server at ten minutes after 10 o'clock, the authentication server generates OTPs between eight minutes thirty seconds after ten o'clock and eight minutes thirty nine seconds after ten o'clock and compares the generated OTPs with the client OTP. If the generated OTPs do not coincide with the client OTP, the authentication server generates OTPs between eight minutes forty seconds after ten o'clock and eight minutes forty nine seconds after ten o'clock and compares the generated OTPs with the client OTP, and such a process is repeated until the authentication succeeds.

In this case, resources of the authentication server are wasted unnecessarily and the unnecessary use of resources may cause overhead that degrades the performance of the authentication server. Accordingly, there is a need for a technology capable of minimizing OTP generation in the authentication server and thus effectively utilizing resources of the authentication server and preventing performance degradation of the authentication server.

SUMMARY

Disclosed embodiments provide a system and a method for one-time password (OTP)-based authentication that is capable of minimizing generation of OTPs in an authentication server.

According to an aspect of the present disclosure, there is provided a system for OTP-based authentication, the system including a transceiver module, an authentication accumulation management module, an OTP generation module and an authentication module. The transceiver module may be configured to receive an authentication request from a client and transmit a result of the authentication according to the authentication request to the client. The authentication accumulation management module may be configured to provide statistical information about authentication success of the client for each time interval within a predetermined effective range of time. The OTP generation module may be configured to generate a server-side OTP using previously stored authentication information and time information that is acquired from the statistical information about authentication success. The authentication module may be configured to authenticate the client by comparing a client-side OTP included in the authentication request with the server-side OTP.

The statistical information about authentication success may include a number of authentication successes of the client or a chance of the client succeeding in authentication for each time interval within the effective range of time.

The OTP generation module may acquire time information about a time interval that has a highest number of authentication successes of the client or a highest chance of the client succeeding in authentication, and generate the server-side OTP using the acquired time information.

The OTP generation module may generate the server-side OTP by sequentially acquiring time information about time intervals starting from the time interval that has the highest number of authentication successes of the client or the highest chance of the client succeeding in authentication until the authentication of the client succeeds in the authentication module.

The authentication accumulation management module, if the authentication of the client succeeds in the authentication module, may update the statistical information about authentication success of a time interval corresponding to the time information in which authentication of the client succeeded in the authentication module.

The authentication accumulation management module may estimate a time error with respect to the client using the statistical information about authentication success of the client, and transmit a time adjustment signal including information about the time error to the client through the transceiver module.

The authentication accumulation management module may allow a system setting time of the client to be adjusted based on the time interval that has the highest number of authentication successes of the client or the highest chance of the client succeeding in authentication.

According to an aspect of the present disclosure, there is provided a method for OTP-based authentication, the method including receiving, by an authentication server, an authentication request from a client, acquiring, by the authentication server, time information within a predetermined effective range of time according to statistical information about authentication success of the client for each time interval within the effective range of time, generating, by the authentication server, a server-side OTP using previously stored authentication information and the acquired time information, authenticating, by the authentication server, the client by comparing a client-side OTP included in the authentication request with the server-side OTP; and transmitting, by the authentication server, a result of the authentication according to the authentication to the client.

The statistical information about authentication success may include a number of authentication successes of the client or a chance of the client succeeding in authentication for each time interval within the effective range of time.

The acquiring of the time information may include acquiring time information about a time interval that has a highest number of authentication successes of the client or a highest chance of the client succeeding in authentication.

The acquiring of the time information may include sequentially acquiring time information about time intervals starting from the time interval that has the highest number of authentication successes of the client or the highest chance of the client succeeding in authentication until the authentication of the client succeeds.

The method may further include, after the generating of the server-side OTP, if the authentication of the client succeeds, updating the statistical information about authentication success of a time interval corresponding to the time information with which authentication of the client succeeded in the authentication module.

The method may further include, after the authenticating of the client, by the authentication server, estimating a time error with respect to the client using the statistical information about authentication success, and transmitting a time adjustment signal including information about the time error to the client.

In the transmitting of the time adjustment signal to the client, a system setting time of the client may be adjusted based on a time interval that has the highest number of authentication successes of the client or the highest chance of the client succeeding in authentication.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present disclosure will be described in detail with reference to the accompanying drawings, in which the exemplary embodiments of the disclosure are illustrative in purpose only and should not be construed as limiting the present disclosure.

In describing the present disclosure, detailed descriptions that are well-known but are likely to make the subject matter of the present disclosure unclear will be omitted in order to avoid redundancy. The terminology used herein is defined in consideration of its function in the present disclosure, and may vary with an intention of a user and an operator or custom. Accordingly, the definition of the terms should be determined based on overall contents of the specification.

These inventive concepts are determined by scope of claims, and it would be appreciated by those skilled in the art that changes and modifications, which have not been illustrated above, may be made in these embodiments without departing from the principles and scope of the disclosure, the scope of which is defined in the claims and their equivalents.

Figure 1:
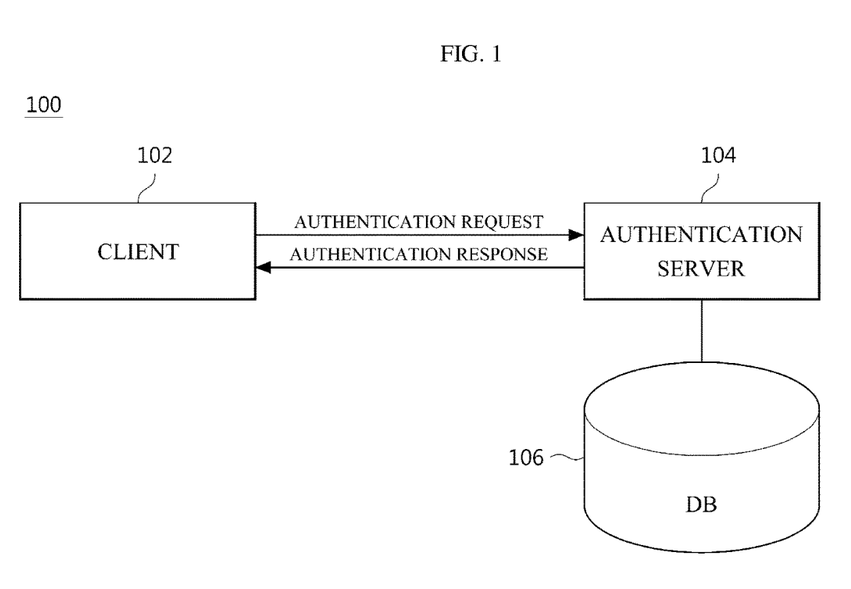
FIG. 1 is a block diagram illustrating a system for one-time password (OTP)-based authentication according to an exemplary embodiment.

FIG. 1 is a block diagram illustrating a system for one-time password (OTP)-based authentication according to an exemplary embodiment.

Referring to FIG. 1, a system for OTP-based authentication 100 includes a client 102, an authentication server 104 and a database 106. The client 102 and the authentication server 104 are connected to each other via a wired or wireless network to exchange data with each other.

The client 102 requests the authentication server 104 to authenticate a user of the client 102, and receives a result of the authentication (an authentication response) according to the authentication request from the authentication server 104. For the authentication, the client 102 generates an OTP using an ID of the user, a token-specific unique value (init_secret) assigned to the user, a personal identification number (PIN) and time information corresponding to the time at which the OTP is generated, and sends the generated OTP, which is included in the authentication request, to the authentication server 104. Since an algorithm of generating the OTP is well known to those skilled in the art and is not the subject matter of the present disclosure, detailed description thereof will be omitted.

The authentication server 104 receives the authentication request from the client 102, performs an authentication according to the authentication request, and transmits the result of the authentication (the authentication response) to the client 102. In order to perform the authentication, the authentication server 10 previously stores an ID of a user of the client 102, a token-specific unique value (init_secret) assigned to the user and a personal identification number (PIN) that are shared with the client 102. That is, the ID, init_secret and PIN information are transmitted to the authentication server 104 by the user in advance.

The authentication server 104 may set an effective range of time on which an error in delay time between the client 102 and the authentication server 104 is reflected. The effective range of time may be set to a range including a predetermined time interval before and after a time at which an authentication request is received (for example, −90 seconds to +90 seconds).

Upon receiving the authentication request from the client 102, the authentication server 104 generates a server-side OTP using information on a time that has the highest number of authentication successes within the effective range of time and the previously stored authentication information (init_secret and PIN) of the client. That is, according to an exemplary embodiment of the present disclosure, the server-side OTP is generated by first using time information of the time that has the highest number of authentication successes within the effective range of time, so that the server-side OTP that has the highest chance of authentication success is generated, thereby preventing a waste of resources of the authentication server 104 and preventing a degradation of performance due to repetitive generation of OTPs.

The authentication server 104 authenticates the client 102 by comparing the generated server-side OTP with the client-side OTP that is included in the authentication request. For example, the authentication server 104 determines that the client 102 is successful in authentication if the server-side OTP generated by the authentication server 104 coincides with the received client-side OTP, and determines that the client 102 has failed in authentication if the server-side OTP does not coincide with the client-side OTP.

In the case of authentication failure, the authentication server 104 generates a server-side OTP using time information of a time that has the second highest number of authentication successes within the effective range of time, and compares the generated server-side OTP with the client-side OTP included in the authentication request so that the client 102 is authenticated. As such, the authentication server 104 sequentially generates the server-side OTPs using time intervals within the effective range of time, starting from a time interval that has the highest number of authentication successes, and compares the generated server-side OTPs with the client-side OTP until authentication succeeds.

In the case of authentication success, the authentication server 104 records an increase of one in the number of authentication successes corresponding to the time within the effective range of time with which authentication succeeded. Whenever authentication succeeds the authentication server 104 may manage the accumulation of the number of authentication successes corresponding to a time interval in which authentication was successful. In this case, as data accumulates, the reliability of the data is increased. That is, the number of authentication successes serves as a criterion that determines a range of time for generating the server-side OTP. In other words, as data about the number of authentication successes for each time interval is accumulated, a time interval having a higher number of authentication successes may have a higher chance of succeeding in authentication.

The database 106 stores and manages the ID of each user, the token-specific unique value (init_secret) of each user and the PIN of each user that are transmitted from the client 102 to the authentication server 104. A single one of the token-specific unique value and the PIN may be provided for each ID. Alternatively, when a plurality of tokens is assigned to a single ID, the plurality of token-specific unique values mapped to and paired with a plurality of PINs may be stored.

Figure 2:
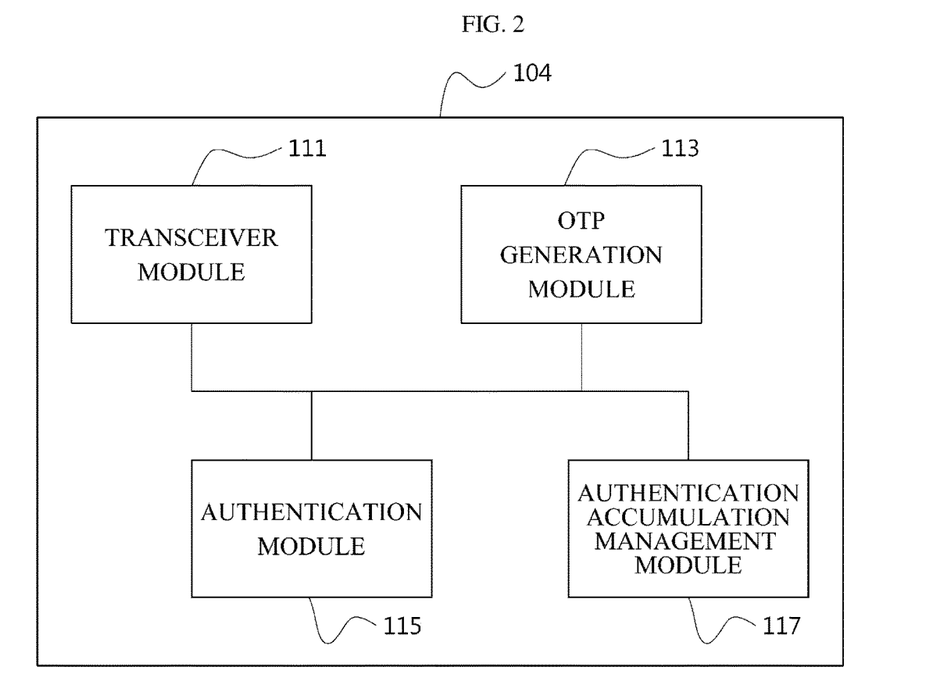
FIG. 2 is a block diagram illustrating a configuration of an authentication server according to an exemplary embodiment.

FIG. 2 is a block diagram illustrating a configuration of the authentication server according to an exemplary embodiment.

Referring to FIG. 2, the authentication server 104 includes a transceiver module (such as a transceiver) 111, an OTP generation module (such as a generator) 113, an authentication module (such as an authenticator) 115 and an authentication accumulation management module (such as an authentication accumulation manager) 117. These modules comprise a combination of hardware and software according to an exemplary embodiment. For example, the generator 113, authenticator 115, and the manager 117 may be a hardware processor executing corresponding software thereon or a circuit or a combination of a processor and a memory.

The transceiver module 111 receives an authentication request from the client 102, and transmits a result of an authentication according to the authentication request to the client 102.

The OTP generation module 113 generates a server-side OTP using user authentication information stored in the database 106 and time information acquired from the authentication accumulation management module 117. In addition, the OTP generation module 113 first acquires time information of a time that has the highest number of authentication successes within an effective range of time from the authentication accumulation management module 117, and generates a server-side OTP using the acquired time information and the user authentication information that is stored in the database 106. The OTP generation module 113 may generate server-side OTPs by sequentially acquiring time information of time intervals within the effective range of time, starting from a time interval that has the highest number of authentication successes, from the authentication accumulation management module 117 until authentication succeeds.

The authentication module 115 authenticates the client 102 by comparing the client-side OTP included in the authentication request with the server-side OTP generated by the OTP generation module 113. The authentication module 115 determines that authentication succeeds if the client-side OTP coincides with the server-side OTP, and determines that authentication fails if the client-side OTP does not coincide with the server-side OTP.

Figure 3:
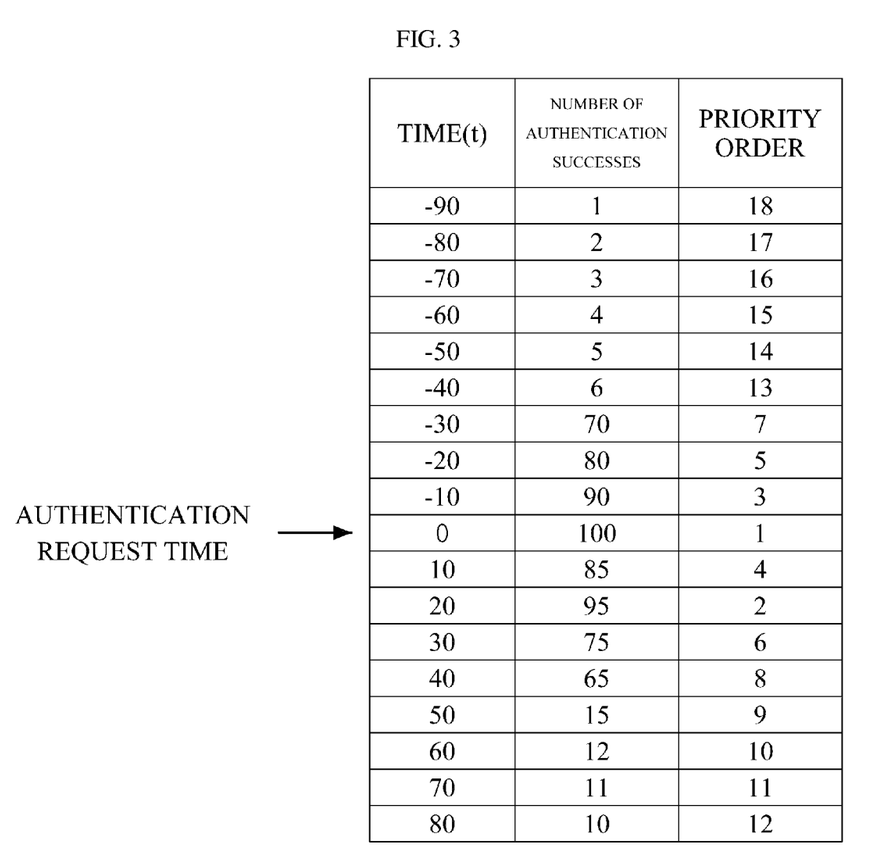
FIG. 3 is a diagram illustrating an authentication accumulation management table according to an exemplary embodiment.

The authentication accumulation management module 117 records the number of authentication successes (a chance of authentication success) for each time interval within an effective range of time. FIG. 3 is a diagram illustrating an authentication accumulation management table according to an exemplary embodiment of the present disclosure. Referring to FIG. 3, the authentication server 104 generates server-side OTPs at 10-second intervals when the effective range of time is set to include 90 seconds before and after an authentication request time (a total of 3 minutes), the authentication accumulation management module 117 records the number of authentication successes (or the chance of authentication success) for every 10-second interval within the range including 90 seconds before and after the authentication request time using the authentication accumulation management table, and assigns an order of priority according to the number of authentication successes (or the chance of authentication success). The authentication accumulation management module 117, if it is determined that authentication succeeds in the authentication module 115, manages a recording of an increase in the number of authentication successes of the time interval corresponding to the time information that is used in generation the server-side OTP by 1.

As such, the authentication server 104 generates the server-side OTPs sequentially using time intervals starting from a time interval that has a high chance of authentication success, so that iterative operation of OTP authentication logic is reduced, and thus waste of resources and degradation of performance are reduced. In addition, with only a single generation of a server-side OTP, the chance of authentication success is increased, so it is possible to improve response time. Therefore, the number of processors simultaneously being handled by the system for OTP based authentication is increased and unnecessary system expansion is prevented.

Figure 4:
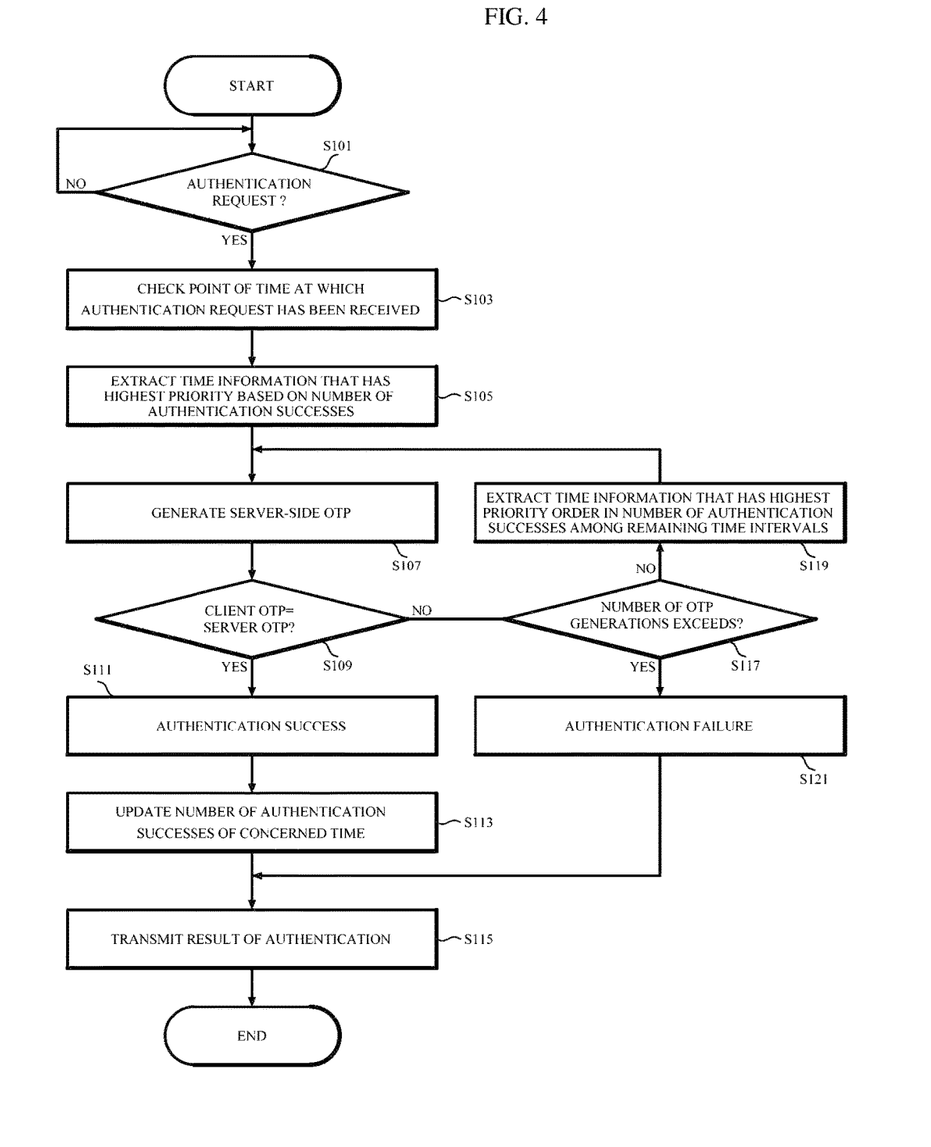
FIG. 4 is a flowchart showing a method for OTP-based authentication.

FIG. 4 is a flowchart showing a method for OTP-based authentication.

Referring to FIGS. 3 and 4, the authentication server 104 checks whether an authentication request is received from the client 102 (S101). If it is confirmed in operation S101 that an authentication request has been received from the client 102, the authentication server 104 checks a point of time at which the authentication request has been received (S103). The authentication server 104 may set an effective range of time based on the point of time at which the authentication request has been received. For example, the authentication server 104 may set a range including 90 seconds before and after the authentication request reception time.

Then, the authentication server 104 extracts time information of a time interval that has a highest number of authentication successes (or a highest chance of authentication success) from the authentication accumulation management table shown in FIG. 3 (S105). In detail, referring to FIG. 3, it is shown that a time interval including 0 seconds (that is, the time point at which the authentication request has been received) in the effective range of time has 100 as the number of authentication successes, and thus is given the highest priority. Accordingly, the authentication server 104 extracts time information of 0 sec (that is, the time point at which the authentication request has been received).

Then, the authentication server 104 generates a server-side OTP using the extracted time information (that is, the time information about the time at which the authentication requested has been received) and user authentication information stored in the database 106 (S107).

Then, the authentication server 104 checks whether the generated server-side OTP coincides with a client-side OTP (that is, an OTP included in the authentication request) (S109).

If it is confirmed in operation S109 that the generated server-side OTP coincides with the client-side OTP, the authentication server 104 determines that the client 102 is successful in authentication (S111). The authentication server 104 increases the number of authentication successes of the corresponding time interval (that is, the time interval including 0 seconds) by 1, updating the number of authentication successes to 101. Then, the authentication server 104 transmits the result of the authentication to the client 102 (S115).

If is confirmed in operation S109 that the generated server-side OTP does not coincide with the client-side OTP, the authentication server 104 checks whether the number of OTP generations exceeds a predetermined maximum number of OTP generations (S117). For example, assuming that the authentication server 104 sets a range including 90 seconds before and after the authentication request time (a total of 3 minutes) as an effective range of time, and generates server-side OTPs at 10-second intervals, the maximum number of generations of the server-side OTPs is 18. In this manner, in operation S117, the authentication server 104 may check whether the number of OTP generations exceeds a predetermined maximum number of OTP generations.

If it is confirmed in operation S117 that the number of OTP generations does not exceed a predetermined maximum number of OTP generations, the authentication server 104 extracts time information of a time interval that has the highest order priority in terms of the number of authentication successes among the remaining time intervals (time intervals except for the time interval including 0 seconds) in the effective range of time (S119). Referring to FIG. 3, a time interval including 20 seconds has the top order priority with the number of authentication successes of 95 among the remaining time intervals in the effective range of time. Accordingly, the authentication server 104 extracts time information of the time interval including 20 seconds. Then, the authentication server 104 returns to operation S107.

If it is confirmed in operation S117 that the number of OTP generations exceeds a predetermined maximum number of OTP generations, the authentication server 104 determines that the client 102 has failed in authentication (S121). Then, the authentication server 104 transmits the result of the authentication to the client 102 (S115).

Meanwhile, the authentication accumulation management table according to the present disclosure records and manages the number of authentication successes for each time interval within an effective range of time, and the recorded number of authentication successes is used to compensate for a time error between the client 102 and the authentication server 104. For example, when the number of authentication successes is considerably high at a time interval including 20 seconds before an authentication request time of the client 102 (that is, 0 seconds), the authentication server 104 may determine that a system setting time of the client 102 is set 20 seconds earlier than a system setting time of the authentication server 104. The authentication server 104 transmits a time adjustment signal including information about the time error with respect to the client 102 to the client 102 so that the system setting time of the client 102 is compensated. In this case, the authentication server 104 may allow the system setting time to be compensated based on a time interval in which the client 102 has a highest number of authentication successes or a highest chance of authentication success.

As is apparent from the above, the authentication sever sequentially generates server-side OTPs of time intervals starting from a time interval that has a high chance of authentication success, so that an iteration of an OTP authentication logic can be reduced, thereby reducing waste of resources in the authentication server and preventing the performance degradation of the authentication server. In addition, the chance of authentication success can be increased with at least a single generation of a server-side OTP, so it is possible to improve response time. Accordingly, the OTP-based authentication system can handle a larger number of processors, thereby preventing unnecessary system expansion.

The present disclosure can also be embodied as a computer readable recording medium that includes a computer executable program configured to perform the methods described in the specification. The computer readable recording medium may be implemented in a program instruction, a local data file, and a local data structure, or in a combination of one or more of these. Meanwhile, the program recorded in the recoding medium may be designed and constructed for the present disclosure or easily constructed by a programmer in the field of computer software. Examples of the computer readable recording medium include a hardware device constructed to store and execute a program instruction, for example, a magnetic media such as a hard disk, a floppy disk, and a magnetic tape, optical media such as a CD-ROM, and a DVD, magneto-optical media such as floptical disk, read-only memory (ROM), random access memory (RAM), and flash memory. In addition, the program instruction may include a machine code made by a compiler, and a high-level language executable by a computer through an interpreter.

The above-described devices may be implemented using hardware components and software components. For example, the devices included in the system for OTP-based authentication 100 may be implemented using hardware components. The hardware components may include a processor and a memory.

The processor may be a controller and an arithmetic logic unit, a digital signal processor, a microcomputer, a field programmable array, a programmable logic unit, a microprocessor or any other device capable of responding to and executing instructions in a defined manner such that the processor is programmed with instructions that configure the processing device as a special purpose computer configured to perform the embodiments of the present disclosure.

For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The memory may be any device capable of storing data including magnetic storage, flash storage, etc.

Although few embodiments have been shown and described, the above embodiments are illustrative in purpose only in implementing the system for OTP-based authentication according to the present disclosure and the operating method thereof, and it will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A system for One Time Password (OTP)-based authentication, the system comprising:
a transceiver, implemented by one or more hardware processors, configured to receive an authentication request from a client and configured to transmit a result of an authentication according to the authentication request to the client;
an authentication accumulation manager, implemented by the one or more hardware processors, configured to provide statistical information about authentication success of the client for each of a plurality of time intervals within a range of time;
an OTP generator, implemented by the one or more hardware processors, configured to generate a server-side OTP using stored authentication information and time information about a time interval selected from the plurality of time intervals based on the statistical information about authentication success; and
an authenticator, implemented by the one or more hardware processors, configured to authenticate the client by comparing a client-side OTP included in the authentication request with the generated server-side OTP,
wherein the statistical information about authentication success comprises one of: a number of authentication successes of the client and a chance of the client succeeding in the authentication for each of the plurality of time intervals,
wherein the OTP generator obtains the time information comprising time information about a time interval from the plurality of time intervals that has one of a highest number of authentication successes of the client and a highest chance of the client succeeding in the authentication, and is further configured to generate the server-side OTP using the obtained time information, and
wherein the plurality of time intervals comprise at least three time intervals.

2. The system of claim 1, wherein the OTP generator generates the server-side OTP by sequentially obtaining time information about time intervals starting from the time interval from the plurality of intervals that has one of the highest number of authentication successes of the client and the highest chance of the client succeeding in authentication until a time interval from the plurality of intervals in which the authentication of the client succeeds in the authenticator.

3. The system of claim 1, wherein in response to the authentication of the client succeeding in the authenticator, the authentication accumulation manager updates the statistical information about authentication success for a time interval corresponding to the time information in which the authentication of the client succeeded in the authenticator.

4. The system of claim 1, wherein the authentication accumulation manager is further configured to estimate a time error with respect to the client using the statistical information about authentication success of the client, and is further configured to transmit, to the client via the transceiver, a time adjustment signal comprising information about the time error.

5. The system of claim 4, wherein the authentication accumulation manager is further configured to provide for adjusting a system setting time of the client based on a time interval from the plurality of intervals that has one of highest number of authentication successes of the client and highest chance of the client succeeding in the authentication.

6. A method for OTP-based authentication, the method comprising:
receiving, by an authentication server from a client, an authentication request;
obtaining, by the authentication server, time information about a time interval selected from a plurality of time intervals within a range of time according to statistical information about authentication success of the client for each of the plurality of time intervals;
generating, by the authentication server, a server-side OTP based on stored authentication information and the obtained time information;
authenticating, by the authentication server, the client by comparing a client-side OTP included in the authentication request with the generated server-side OTP; and
transmitting, by the authentication server to the client, a result of the authentication based on the authenticating,
wherein the statistical information about authentication success comprises one of: a number of authentication successes of the client and a chance of the client succeeding in the authentication for each of the plurality of time intervals, wherein the time information comprises time information about a time interval from the plurality of time intervals that has one of a highest number of authentication successes of the client and a highest chance of the client succeeding in the authentication, and wherein the plurality of time intervals comprise at least three time intervals.

7. The method of claim 6, wherein the obtaining the time information comprises sequentially obtaining time information about the plurality of time intervals starting from the time interval from the plurality of time intervals that has one of the highest number of authentication successes of the client and the highest chance of the client succeeding in the authentication until a time interval from the plurality of time intervals in which the authentication of the client succeeds.

8. The method of claim 6, further comprising:

in response to the authentication of the client succeeding and after the generating the server-side OTP, updating the statistical information about authentication success of a time interval from the plurality of time intervals corresponding to the time information in which the authentication of the client has succeeded.

9. The method of claim 6, further comprising:

after the authenticating of the client, estimating, by the authentication server, a time error with respect to the client based on the statistical information about authentication success; and transmitting, to the client, a time adjustment signal comprising information about the time error.

10. The method of claim 9, wherein, the transmitting the time adjustment signal comprises providing for an adjustment of a system setting time of the client based on a time interval from the plurality of time intervals that has one of the highest number of authentication successes of the client and the highest chance of the client succeeding in the authentication.

11. A non-transitory computer readable recording medium storing a computer program, which executes the following operations comprising:

receiving an authentication request from a client;

obtaining time information about a time interval selected from a plurality of time intervals within a range of time based on statistical information about authentication success of a client for each of the plurality of time intervals within the range of time;

generating a server-side OTP based on stored authentication information and the obtained time information;

authenticating the client by comparing a client-side OTP included in an authentication request received from the client with the generated server-side OTP; and transmitting a result of the authentication based on the authenticating, wherein the statistical information about authentication success comprises one of: a number of authentication successes of the client and a chance of the client succeeding in the authentication for each of the plurality of time intervals, wherein the time information comprises time information about a time interval from the plurality of time intervals that has one of a highest number of authentication successes of the client and a highest chance of the client succeeding in the authentication, and wherein the plurality of time intervals comprise at least three time intervals.

\* \* \* \* \*